United States Patent

Reichert et al.

[11] Patent Number: 6,079,552
[45] Date of Patent: Jun. 27, 2000

[54] CONVEYOR CHAIN

[75] Inventors: Gerhard Reichert; Jörg Nolte, both of Marktheidenfeld, Germany

[73] Assignee: Wolf-Montage-Automationsanlagen+ Sondermaschinen GmbH, Helmstadt, Germany

[21] Appl. No.: 08/895,007

[22] Filed: Jul. 16, 1997

[30] Foreign Application Priority Data

Jul. 23, 1996 [DE] Germany ........................ 296 12 735 U

[51] Int. Cl.[7] ................................................. B65G 17/06
[52] U.S. Cl. ............................................................. 198/852
[58] Field of Search ............................................. 198/852

[56] References Cited

U.S. PATENT DOCUMENTS

| 4,004,682 | 1/1977 | Schuler ................................. | 198/852 |
| 4,597,492 | 7/1986 | Lachonius et al. .................... | 198/852 |
| 4,895,248 | 1/1990 | Wahren ................................. | 198/852 |

FOREIGN PATENT DOCUMENTS 3235224  7/1987  Germany .

Primary Examiner—Joseph E. Valenza
Attorney, Agent, or Firm—Friedrich Kueffner

[57] ABSTRACT

A conveyor chain for a transporting plant in which each chain link made of a synthetic material includes a plate for supporting the material to be conveyed, a head piece provided with a cylindrical bore and a yoke-shaped portion with two legs extending from the head piece. For cardanically coupling two chain links, a bolt rotatably inserted in the cylindrical bore of the head piece is provided with a transverse bore and the legs of the chain link are provided with bores in alignment with the transverse bore, wherein a metal connecting pin is inserted into the transverse bore of one chain link and in the bores of the legs of the preceding chain link in travel direction. The bolt inserted into the bore of the head piece has a recess and a roller is placed in the recess, wherein the roller is rotatably supported on the connecting pin, the roller is in engagement with the teeth of a drive wheel and the roller is of a synthetic material having a higher strength than the synthetic material of the head piece. In addition or alternatively, a reinforcement insert is placed on the sides of the legs of the yoke-shaped portion which face each other.

11 Claims, 2 Drawing Sheets

CONVEYOR CHAIN

BACKGROUND OF THE INVENTION

1. Field of the Invention

The present invention relates to a conveyor chain for a transporting plant in which each chain link made of a synthetic material includes a plate for supporting the material to be conveyed, a head piece provided with a cylindrical bore and a yoke-shaped portion with two legs extending from the head piece. For cardanically coupling two chain links, a bolt rotatably inserted in the cylindrical bore of the head piece is provided with a transverse bore and the legs of the chain link are provided with bores in alignment with the transverse bore, wherein a metal connecting pin is inserted into the transverse bore of one chain link and in the bores of the legs of the preceding chain link in travel direction.

2. Description of the Related Art

A conveyor chain of the above-described type is known from DE 32 35 224 C2. In the assembled state, the plates supporting the material to be conveyed are at the top. The front and rear transverse edges in conveying direction are provided with teeth, wherein the teeth are offset relative to each other, so that the teeth of the rear transverse edge engage in the tooth gaps of the front transverse edge of the next following chain link. These types of conveyor chains have the advantage that they can be guided in a horizontal plane as well as about a horizontal axis. The deflection in a horizontal plane is made possible by a bolt inserted in the bore of the head piece. The deflection about a horizontal axis is made possible by the connecting pin which couples the chain links.

In conveyor chains of the above-described type, each plate forms together with the head piece and the yoke-shaped portion a single structural component which is made of synthetic material. Because of its elasticity, the conveyor chain is expanded to a relatively significant extent. This expansion causes an unfavorable dynamic behavior, so that the travel of the chain is not smooth which is called the stick-slip effect in the art of conveyor chains. Moreover, the drive situation is no longer exactly definable. The fact that the travel is not smooth has a negative effect on the positioning of the material being conveyed and, thus, the operational safety of the transporting plant. The conveyor chain is usually driven by means of chain wheels over which the conveyor chain is guided. These chain wheels engage with the connecting pin. The non-rotatable support results in unfavorable engagement conditions, so that the wear of the chain wheel and of the conveyor chain is increased. Consequently, the operational safety and the service life of the conveyor chain are reduced.

SUMMARY OF THE INVENTION

Therefore, it is the primary object of the present invention to provide a conveyor chain of the above-described type which is constructed in a simple manner is such a way that the expansion is reduced as compared to conventional embodiments, the service life is increased and a drive situation which is defined and remains as uniform as possible is ensured during the service life.

In accordance with the present invention, the bolt inserted into the bore of the head piece has a recess and a roller is placed in the recess, wherein the roller is rotatably supported on the connecting pin, the roller is in engagement with the teeth of a drive wheel and the roller is of a synthetic material having a higher strength than the synthetic material of the head piece. In addition or alternatively, a reinforcement insert is placed on the sides of the legs of the yoke-shaped portion which face each other.

The metal roller rotatably placed on the connecting pin results in a drive situation which is comparable to that of steel roller chains. This especially reduces the friction, so that the service life of the drive wheel and of the chain links is increased. However, depending on the type of application, it is also possible to omit the roller and to equip the conveyor chain with the reinforcement inserts. The combination of the roller with the reinforcement insert is also advantageous. The reinforcement insert increases the stiffness of the chain. The reinforcement insert is secured to the legs of the respective chain link by the connecting pin when the conveyor chain is assembled. As a result of the configuration of the conveyor chain according to the present invention, in particular the combination of the roller with the reinforcement insert, the tensile forces acting on the chain are absorbed by parts which can be highly stressed, such as, the roller, the connecting pin and the reinforcement insert. The relatively low guide forces and the load are absorbed by the parts of synthetic material. In spite of this advantageous configuration, the cardanic mobility of the chain is fully maintained.

In accordance with an embodiment of the present invention, the reinforcement insert is composed of a reinforcement tape which is shaped in accordance with the contour of the inner surfaces of the legs of the yoke-shaped portion, wherein the reinforcement tape is preferably of metal and is provided with bores for securing the reinforcement tape by means of the connecting pin. The bores are located in the free end areas of the two legs of the reinforcement insert. The connection is reinforced by having the reinforcement tape engage around the cylindrical bolt, so that this are of the reinforcement tape extends in an arc. By providing the reinforcement tape and the roller preferably made of steel and the connecting pin, the forces are transmitted by structural components which have an extremely high load bearing capacity.

In accordance with another feature of the present invention, the reinforcement tape is of fiber-reinforced synthetic material, for example, a carbon fiber-reinforced synthetic material. Materials of this type are subject to little expansion. Moreover, their weight is relatively low. However, the reinforcement insert may also be of metal, preferably of steel. The same is true for the roller. Metal materials offer a sufficient strength and can also be processed very well.

In accordance with another proposal, the roller is made of a sintered metal. Because this material has self-lubricating properties, the emergency running conditions are excellent.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
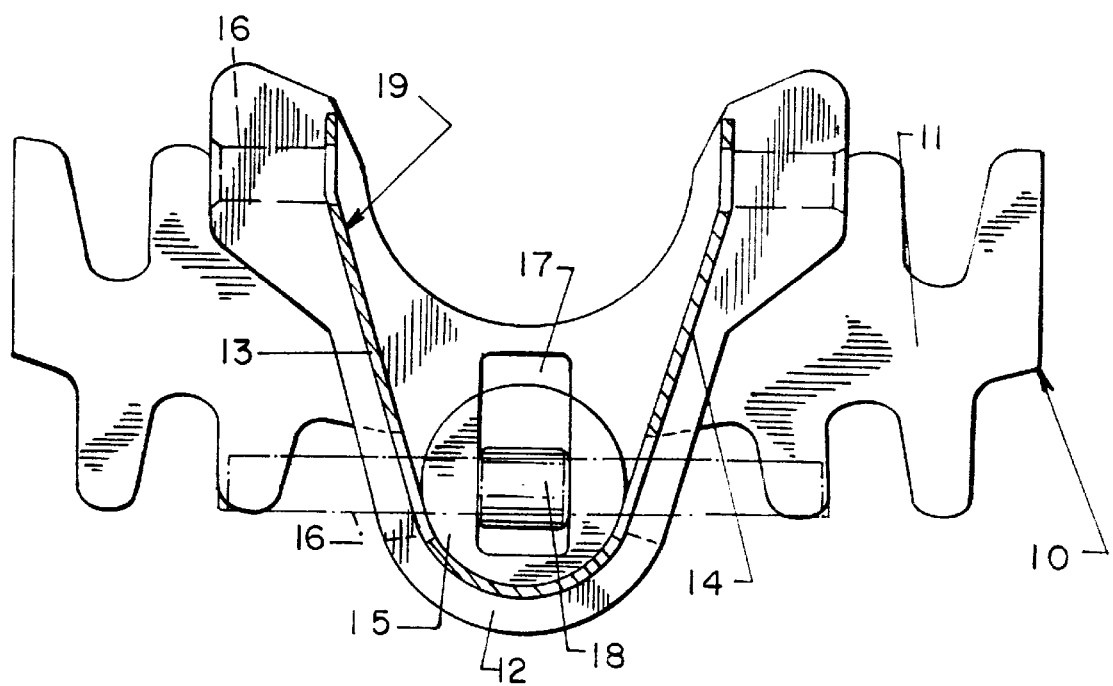
FIG. 1 is a bottom view, partially in section, of a chain link as a component of a conveyor chain according to the present invention.

The chain link 10 shown in FIG. 1 is composed of a plate 11 on which is placed the material to be conveyed, not shown. The chain link 10 further includes a head piece 12 arranged on the side facing away from the material being conveyed and two legs 13, 14 extending from the head piece 12, wherein the distance between the two legs 13, 14 increases with increasing distance from the head piece 12. Seen in conveying direction of the conveyor chain, the head piece 12 is located at the front of the chain link. The head piece 12 is provided with a cylindrical bore extending transversely of the plane of the plate 11, wherein a cylindrical bolt 15 is rotatably placed in the bore.

The bolt 15 is provided with a transverse bore in which is rotatably inserted a connecting pin 16 of steel. This produces the connection with the chain link 10, which is the preceding chain link in conveying direction. The two legs 13, 14 of the yoke-shaped portion of the chain link 10 are also provided with a bore each, wherein the bores of the legs 13, 14 are in alignment with the transverse bore of the bolt 15. The connecting pin 16 extends through the bores of the legs 13, 14. In the area located opposite the head piece 12, the two legs 13, 14 are provided with bores, so that the next following chain link in conveying direction can be connected to the chain link 10 shown in FIG. 1.

The cylindrical bolt 15 is provided with a recess 17, so that a roller 18 can be placed rotatably on the connecting pin 16. The roller 18 of each chain link 10 is in engagement with the drive chain wheels, not shown, of the conveyor chain. This results in conditions that are the same as in a roller chain of steel. The plate 11, the head piece 12 and the legs 13, 14 of the yoke-shaped portion are of synthetic material.

For transmitting the forces, each chain link 10 of the illustrated embodiment is provided with an insert 19. In the illustrated embodiment, the insert 19 is shaped from a steel tape or fiber-reinforced synthetic material which rests against the inner sides of the legs 13, 14 which face each other and engages around the bolt 19. The tape 19 is provided with positionally aligned bores, so that the connecting pin 16 can extend therethrough, which additionally secures the tape.

Figure 2:
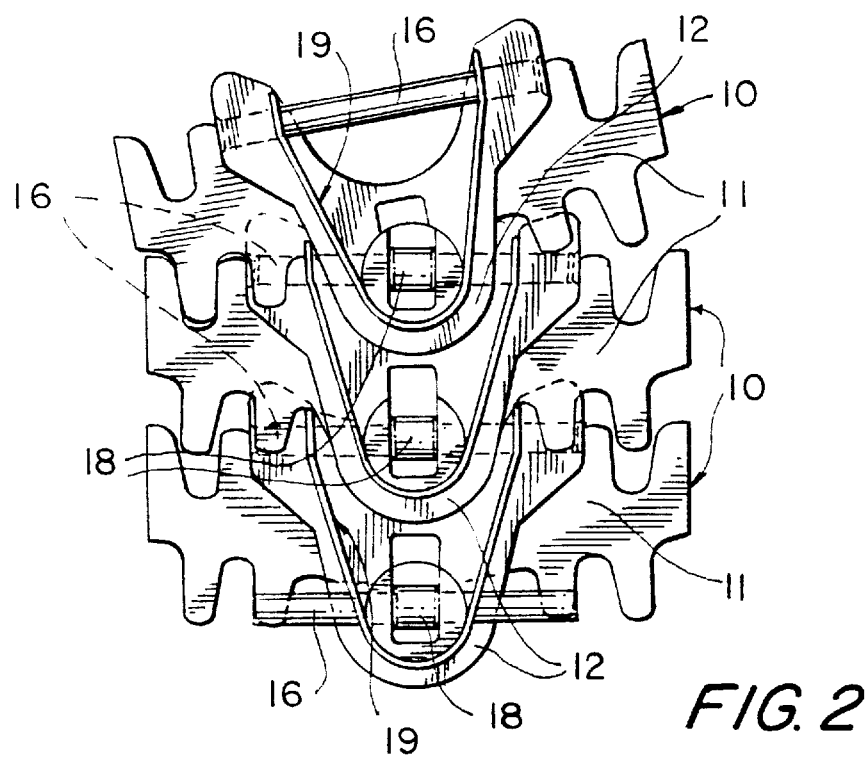
FIG. 2 shows, also in a bottom view, several chain links as shown in FIG. 1 coupled together.
Figure 3:
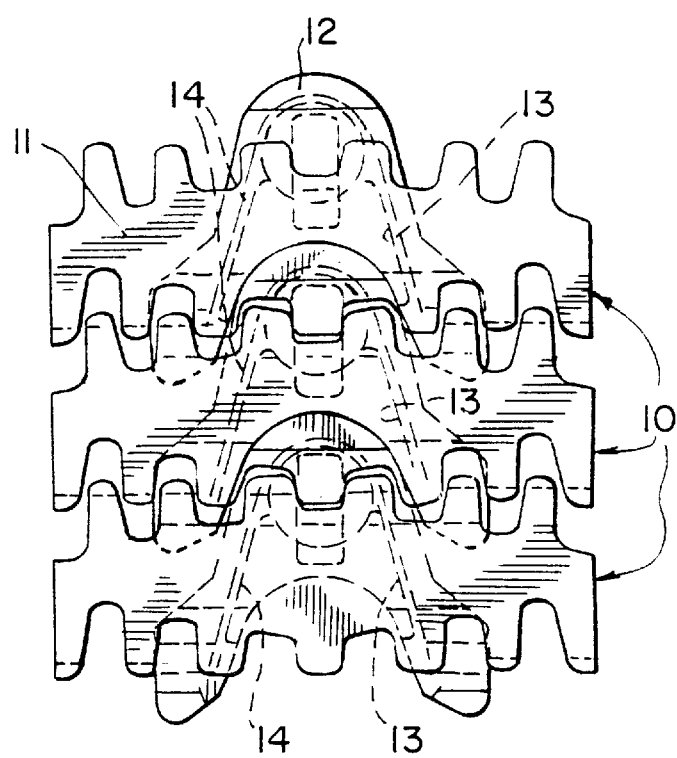
FIG. 3 shows the chain links of FIG. 2 in a top view.

FIG. 2 of the drawing shows the mobility of the chain links 10 in a horizontal plane. This is the result of the rotatability of the cylindrical bolt 15. For this purpose, each chain link 10 can be turned toward the left and right by an angle of, for example, 10° relative to the straight longitudinal center axis of a string of links. The chain links 10 are provided with teeth at the front and rear transverse edges as seen in conveying direction in such a way that the teeth of the rear transverse edge engage in the tooth gaps of the front transverse edge of the next following chain link. This additionally prevents a gap between two chain links 10, so that the support surface formed by the chain links 10 can operationally be considered as providing a full surface.

The tape 19 serving for reinforcement may be of steel or a fiber-reinforced synthetic material. Preferably, a carbon fiber-reinforced synthetic material is used. The roller 18 may be of steel or also of a sintered metal.

While specific embodiments of the invention have been shown and described in detail to illustrate the inventive principles, it will be understood that the invention may be embodied otherwise without departing from such principles.

We claim:

1. A conveyor chain for a transporting plant, the conveyor chain comprising a plurality of chain links of a synthetic material, each chain link having a plate for supporting material to be conveyed, a head piece provided with a cylindrical bore and a yoke-shaped portion with two legs extending from the head piece, wherein, for a cardanic coupling of two chain links, a bolt rotatably inserted in the cylindrical bore of the head piece is provided with a transverse bore and the legs of a chain link preceding in travel direction are provided with bores in alignment with the transverse bore, further comprising a metal connecting pin inserted in the transverse bore and the bores of the legs, wherein the bolt inserted in the bore of the head piece has a recess, further comprising a roller rotatably mounted on the connecting pin received in the recess, wherein the roller is in engagement with teeth of a drive wheel and is of a synthetic material having a strength greater than the synthetic material of the head piece, and a reinforcement insert placed on sides of the legs of the yoke-shaped section which face each other.

2. The conveyor chain according to claim 1, wherein the reinforcement insert is of a V-shaped reinforcement tape shaped in accordance with a contour of inner surfaces of the legs of the yoke-shaped portion, wherein the reinforcement tape is provided with bores for securing the reinforcement tape by the connecting pin.

3. The conveyor chain according to claim 1, wherein the roller and the reinforcement insert are of steel.

4. The conveyor chain according to claim 1, wherein the reinforcement insert is of a fiber-reinforced synthetic material.

5. The conveyor chain according to claim 1, wherein the reinforcement insert is of a carbon fiber-reinforced synthetic material.

6. The conveyor chain according to claim 1, wherein the roller is of a sintered metal.

7. A conveyor chain for a transporting plant, the conveyor chain comprising a plurality of chain links of a synthetic material, each chain link having a plate for supporting material to be conveyed, a head piece provided with a cylindrical bore and a yoke-shaped portion with two legs extending from the head piece, wherein, for a cardanic coupling of two chain links, a bolt rotatably inserted in the cylindrical bore of the head piece is provided with a transverse bore and the legs of a chain link preceding in travel direction are provided with bores in alignment with the transverse bore, further comprising a metal connecting pin inserted in the transverse bore and the bores of the legs, further comprising a reinforcement insert placed on sides of the legs of the yoke-shaped section which face each other.

8. The conveyor chain according to claim 7, wherein the reinforcement insert is of a V-shaped reinforcement tape shaped in accordance with a contour of inner surfaces of the legs of the yoke-shaped portion, wherein the reinforcement tape is provided with bores for securing the reinforcement tape by the connecting pin.

9. The conveyor chain according to claim 7, wherein the reinforcement insert is of steel.

10. The conveyor chain according to claim 7, wherein the reinforcement insert is of a fiber-reinforced synthetic material.

11. The conveyor chain according to claim 7, wherein the reinforcement insert is of a carbon fiber-reinforced synthetic material.

* * * * *